United States Patent
Bovet et al.

(10) Patent No.: US 11,635,989 B2
(45) Date of Patent: Apr. 25, 2023

(54) SYSTEMS AND METHODS DYNAMICALLY ROUTING AN EVENT TO A COMPONENT OF A HYBRID APPLICATION

(71) Applicant: salesforce.com, inc., San Francisco, CA (US)

(72) Inventors: Jean Elie Bovet, Los Angeles, CA (US); Adam Liechty, Vancouver, WA (US); Joao Henrique Pimentel Wanderley Neves, San Mateo, CA (US); Guo Li, San Francisco, CA (US); Paul Tiarks, Tinley Park, IL (US)

(73) Assignee: Salesforce, Inc., San Francisco, CA (US)

( * ) Notice: Subject to any disclaimer, the term of this patent is extended or adjusted under 35 U.S.C. 154(b) by 134 days.

(21) Appl. No.: 17/091,452

(22) Filed: Nov. 6, 2020

(65) Prior Publication Data

US 2022/0147389 A1    May 12, 2022

(51) Int. Cl.
*G06F 9/50* (2006.01)
*G06F 3/04817* (2022.01)

(52) U.S. Cl.
CPC ............ *G06F 9/50* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 8,595,752 B1* | 11/2013 | Fioravanti | G06F 9/541 709/217 |
| 2002/0083212 A1* | 6/2002 | Salmon | G06F 9/44521 719/313 |
| 2003/0058277 A1* | 3/2003 | Bowman-Amuah | G06F 16/289 715/765 |
| 2014/0047517 A1* | 2/2014 | Ding | H04L 12/1453 726/5 |
| 2014/0136954 A1* | 5/2014 | Ligman | G06F 17/00 715/234 |
| 2015/0135198 A1* | 5/2015 | Pack, III | G06F 9/542 719/318 |
| 2015/0347119 A1* | 12/2015 | Wang | H04L 69/04 717/120 |

(Continued)

*Primary Examiner* — Qing Chen
(74) *Attorney, Agent, or Firm* — Sterne, Kessler, Goldstein & Fox P.L.L.C.

(57) ABSTRACT

The present disclosure is directed to dynamically routing an event to a component of a hybrid application. For example, a method may include: detecting an event from a first component of a first component type of a hybrid application; transmitting a request to execute a function associated with the event to a plurality of components, the plurality of components being a combination of components of the first component type and components of a second component type different from the first component type, the first component being different from the plurality of components; dynamically determining which component of the plurality of components to assign to execute the function, the dynamically determining being based on which components of the plurality of components are available to execute the function and one or more rules; assigning the function to the determined component; and receiving a result of the function from the determined component.

20 Claims, 4 Drawing Sheets

(56) References Cited

U.S. PATENT DOCUMENTS

| | | | |
|---|---|---|---|
| 2017/0017386 A1* | 1/2017 | Mattson | G06F 16/957 |
| 2017/0300314 A1* | 10/2017 | Lopyrev | G06F 9/54 |
| 2018/0109434 A1* | 4/2018 | Venkiteswaran | H04L 43/50 |
| 2018/0203839 A1* | 7/2018 | Myrén | G06F 40/186 |
| 2019/0130047 A1* | 5/2019 | Karthik | H04L 67/025 |
| 2021/0334197 A1* | 10/2021 | Peter | H04L 67/34 |

* cited by examiner

SYSTEMS AND METHODS DYNAMICALLY ROUTING AN EVENT TO A COMPONENT OF A HYBRID APPLICATION

BACKGROUND

Hybrid applications include various components across a variety of technology stacks, e.g., native components and web components, and event routing is limited to components of the same type. That is, event routing is limited to native-to-native components and web-to-web components, as the different technology stacks do not naturally interact with one another. Additionally, event routing is defined using static routing tables that define which components are dedicated to performing certain functions associated with an event, with components of the same technology stack performing the functions for one another.

Thus, there is a need to provide a way for components of different technology stacks to interact with one another in a simple, robust and scalable way, and in a manner designed to accommodate runtime changes to the routes.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
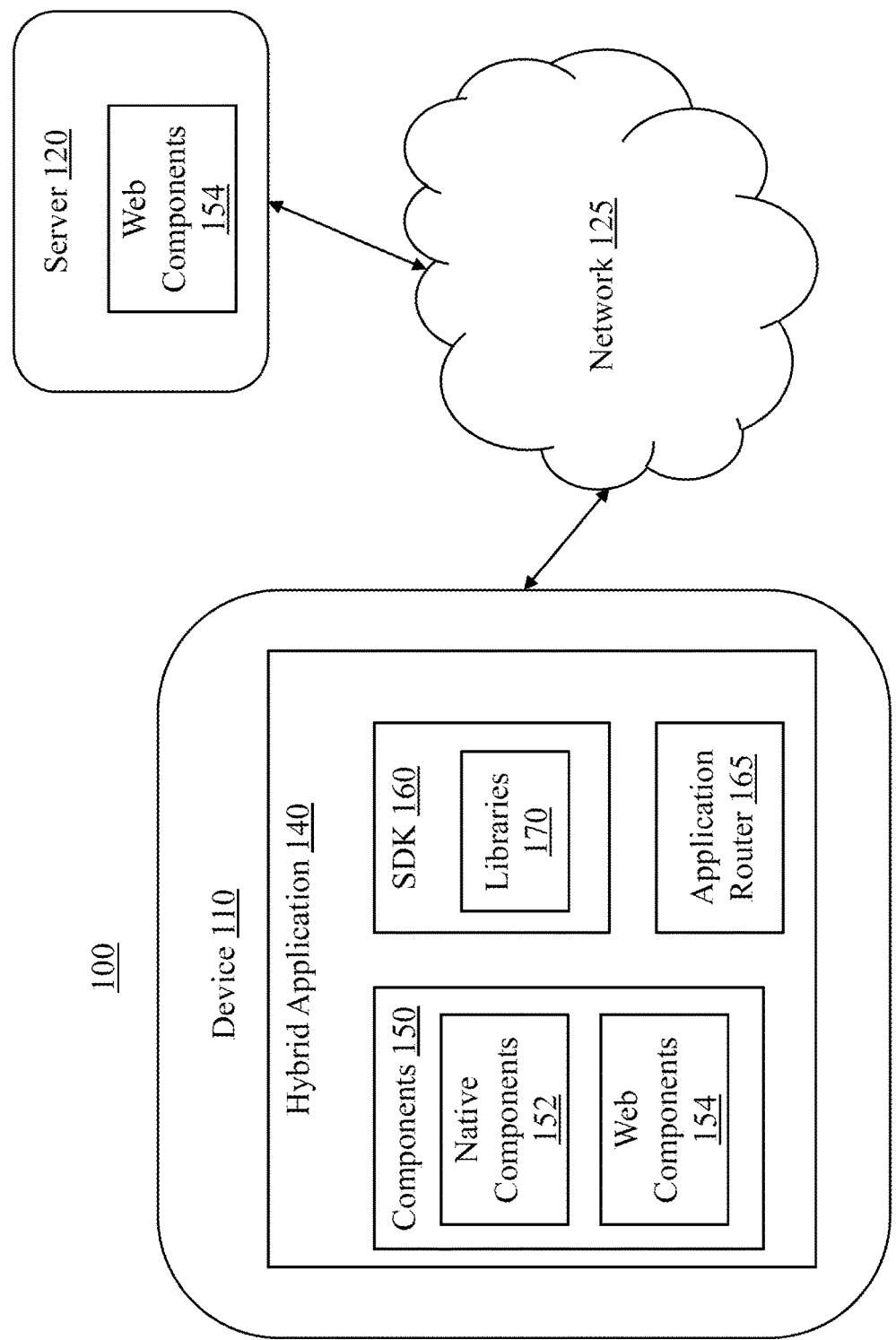
FIG. 1 is a block diagram of a system, according to some example embodiments.

It is to be appreciated that the Detailed Description section, and not the Abstract sections, is intended to be used to interpret the claims. The Summary and Abstract sections may set forth one or more but not all example embodiments as contemplated by the inventor(s), and thus, are not intended to limit the appended claims in any way.

The present disclosure is directed to an ecosystem for incorporating new components into a mobile application operating on a client device. The ecosystem includes a combination of two pieces. First, on the client device, the ecosystem may include a system design kit (SDK) that includes a set of native client libraries that support retrieving, caching, priming, and providing offline support for components hosted on a server. In some embodiments, native components may be exposed to web components using a bridging framework. The SDK may include new libraries, as well as code for authorizing, managing web views, and navigation that will be extracted from the application operating on the client device. Second, on a server, the ecosystem may include a component that serves as a container for hosting the components.

In some embodiments, the ecosystem may delegate event routing to the hosting application, e.g., a hybrid application operating on a client device. In some embodiments, the hybrid application may perform this event routing dynamically, e.g., the event routing may be determined at the time of the event. Additionally, in some embodiments, the event routing may be performed between components across different technology stacks, e.g., between native components and web components, as well as between components of the same technology stack. A web component may be, for example, a component operating on a host application that is used to retrieve content over an Internet connection and a native component may be, for example, a component used operate locally on the host application. Thus, as the native components and web components operate differently from one another, they are operating on different technology stacks.

This can be achieved using an agnostic routing grammar, such that both native components and web components can route tasks between each other regardless of the technology stack. Using the agnostic routing grammar, the hybrid application may dynamically determine which component to execute a function associated with an event, rather than being based on a predefined routing table. As a result, the hybrid application may accommodate changes to the availability of components operating on the hybrid application. Lastly, the event routing can be based on a priority scheme that utilizes different rules for determining which components to assign the function to. Thus, the present disclosure provides the following advantages over existing routing schemes: (1) defining and leveraging an agnostic routing grammar to express the routing in such a way that any component can understand; (2) defining a dynamic routing scheme that can dynamically change event routing due to external changes, such as changes to the availability of a component; and (3) defining a priority scheme that takes into account current context information and routes events accordingly.

FIG. 1 is a diagram of an example environment 100 in which example systems and/or methods may be implemented. As shown in FIG. 1, environment 100 may include a device 110, a server 120, and a network 125. Devices of the environment 100 may interconnect via wired connections, wireless connections, or a combination of wired and wireless connections. Devices of environment 100 may include a computer system 400 shown in FIG. 4, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

In some embodiments, the device 110 may be, for example, a mobile phone (e.g., a smart phone, a radiotelephone, etc.), a handheld computer, tablet, a laptop, a gaming device, a wearable communication device (e.g., a smart wristwatch, a pair of smart eyeglasses, etc.), or a similar type of device that is configured to operate an application, such as a hybrid application 140 described herein.

The server 120 may include a server device (e.g., a host server, a web server, an application server, etc.), a data center device, or a similar device, capable of communicating with the computing device 110 via the network 125. The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some embodiments, the server 120 may store a plurality of web components 154, which may be added to or removed from the hybrid application 140. For example, the plurality of web components 154 may be added to the hybrid application by downloading the plurality of web components 154 at the device 110 from the server 120 over the network 125, as should be understood by those of ordinary skill in the art. Additionally, the plurality of web components 154 may be removed from the device 110 by uninstalling the plurality of web components 154 from the client device 110.

In some embodiments, the device 110 may include a plurality of components 150 that may include one or more of the plurality of native components 152 and one or more of the plurality of web components 154. As discussed in greater detail below, one or more of the plurality of components 150 may be enabled and disabled at either the server 120 or on the device 110. For example, a developer may enable/disable one or more of the plurality of components 150 via a user interface on the device 110 or a user interface on the server 120. In some embodiments, when the one or more of the plurality of components 150 are disabled using the server 120, the server 120 may notify the hybrid application 140 on the client device 110 that the one or more of the plurality of components 150 has been enabled/disabled.

In some embodiments, the hybrid application 140 may include a system design kit (SDK) 160 and an application router 165. In some embodiments, the SDK 160 and the application router 165 may operate in conjunction with one another to execute an agnostic routing grammar, rather than implementing a routing grammar specific to each component type, e.g., web components 154 versus native components 152. This agnostic routing grammar may be used by the SDK 160 and the application router 165 to route events to components across different technology stacks, e.g., between native components 152 and web components 154, as well as within the same technology stack. That is, during operation of the hybrid application 140, the native components 152 and the web components 154 may request different events to take place, and in some embodiments, the SDK 160 and the application router 165 may be responsible for handling routing of these events. In some embodiments, event scenarios may include navigating from a web component 154 to a native component 152, navigating from a web component 154 to another web component 154, navigating from a native component 152 to a web component 154, and navigating from a native component 152 to another native component 152.

Figure 2:
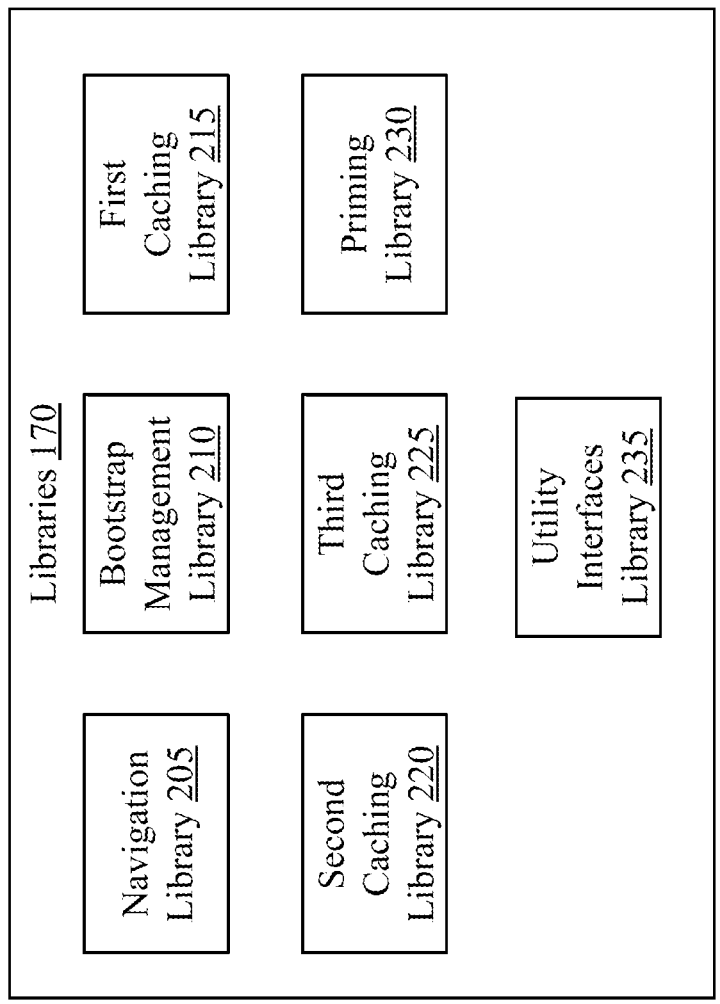
FIG. 2 is a block diagram of a plurality of libraries of a system design kit (SDK), according to some example embodiments.

In some embodiments, the SDK 160 may include a plurality of libraries 170. For example, as shown in FIG. 2, the plurality of libraries 170 include a include navigation library 205 that provides for web view management and navigation handling, a bootstrap management library 210 that provides for the retrieval and caching of host pages and bootstrap management, a first caching library 215 that provides for data caching with native requests and storage, a second caching library 220 that provides for component definition retrieval and caching, a third caching library 225 that provides for caching and injection of resources, a priming library 230 that provides for the ability to prime specific modules, and a utility interfaces library 235 that provides for utility interfaces and allows for plugging in different network and storage implementations. It should be understood by those of ordinary skill in the arts that these are merely some examples of libraries and that other libraries are further contemplated in accordance with aspects of the present disclosure.

In some embodiments, the SDK 160 and the application router 165 may use the navigation library 205 to execute the agnostic routing grammar. By doing so, the SDK 160 and the application router 165 may perform event routing dynamically. For example, the event routing may change based on the availability of the plurality of components 150 at the time one of the plurality of components 150 emits an event. That is, the SDK 160 and the application router 165 may determine which one(s) of the plurality of components 152 are available to execute a function related to the event, rather than relying a predetermined routing table.

To achieve this, the SDK 160 may receive an event request from one of the plurality of components 150, e.g., one of the native components 152 or one of the web components 154, and forward the event to the application router 165. In some embodiments, the event may be generated by one of the plurality of components in response to a user interaction with the hybrid application 140, e.g., a user clicking on an icon displayed on a first graphical user interface (GUI) of the hybrid application 140. Upon receipt of the event request, the application router 165 may transmit an inquiry to non-requesting components of the plurality of components 150, i.e., the other ones of the native components 152 and web components 154, inquiring whether or not they can handle a function associated with the event. The function may be, for example, a visual transition from the first GUI of the hybrid application to a second GUI of the hybrid application 140. In some embodiments, the SDK 160 may store a list of all available components operating on the hybrid application 140 using, for example, the navigation library 205. Using this list of the available components operating on the hybrid application 140, the application router 165 transmits the inquiry to currently available components from among the plurality of components 150, rather than transmitting the inquiry to components that may be unavailable at the time of the event request.

In some embodiments, the availability of components capable of executing the function related to the event may change at run-time of the event, and as such, the SDK 160 and application router 165 may dynamically determine which components of the non-requesting components to execute the function associated with the event based on such availability. For example, the availability the plurality of components 150 may change based on an enabled/disabled status of each of the plurality of components 150, e.g., the plurality of components 150 may be enabled or disabled at various times during operations of the hybrid application 140. This may be a result of a developer of the hybrid application 140 enabling/disabling one or more of the plurality of components 150 either using the device 110 or the server 120. For example, the developer may disable one of the plurality of components 150 in order to debug the component or the developer may disable one of the plurality of components 150 to test a response of a backup component for executing a function associated with the event, e.g., the developer may disable one of the native components 152 to test the response of a web component 154 (or vice-versa) to ensure that the hybrid application 140 provides the same quality of experience to a user of the hybrid application 140. However, once the component has been debugged or backup component tested, the SDK 160 may add the disabled component back to the list of all available components once it has been enabled.

As another example, the availability the plurality of components 150 may change based on an installment status of the component, e.g., whether the component has been installed or uninstalled on the hybrid application 140. For example, any component may be installed/uninstalled at any given time during operation of the hybrid application 140, and as such, the SDK 160 may update the list of all available components accordingly. For example, as new components are developed and installed on the hybrid application 140, the newly installed component(s) may be seamlessly incorporated into the plurality of components 150 operating within the hybrid application 140, as described in co-pending U.S. patent application Ser. No., titled "Systems And Methods For Integrating Mobile Application Plug-Ins," the contents of which are hereby incorporated by reference in their entirety. Additionally, the SDK 160 may add the newly installed components to the list of available components stored in the navigation library 205. On the other hand, some components may be uninstalled, as opposed to being temporarily disabled, from the hybrid application 140, and thus removed from the list of available components stored in the navigation library 205.

In some embodiments, the components 150 that are available to execute a function associated with a request may be based on an operating version of the hybrid application 140. For example, in some embodiments, different components may be enabled to execute a given function in different versions of the application. As such, the list of available components stored in the navigation library 205 may be based on the operating version of the hybrid application 140.

In some embodiments, the application router 165 may transmit the inquiry serially to the non-requesting components of the plurality of components 150 until one of the non-requesting components positively responds to the inquiry indicating that it can handle the function associated with the event. In some embodiments, the application router 165 may transmit the inquiry in parallel to each of the non-requesting components of the plurality of components 150.

In some embodiments, based on the response(s) to the inquiry to the non-requesting components of the plurality of components 150, the SDK 160 may dynamically determine which component of the non-requesting components to assign to execute the function. In some embodiments, the dynamically determining may be based on which components of the plurality of components positively responded to the inquiry. In some embodiments, the dynamically determining may be based on one or more rules. For example, even though a component may be among the plurality of components 150, the availability any given components may change based on for at least the reasons discussed herein. As the SDK 160 maintains a list of available components at the time of the event request, the SDK 160 and the application router 165 may accommodate changes to which components, i.e., native components 152 and web components 154, are currently available on the hybrid application 140 and dynamically determine which component to assign the function associated with the event request. Consequently, the SDK 160 and the application router 165 may seamlessly assign the function to an available component, rather than calling upon a component that may be unavailable for the reasons discussed herein. That is, as the availability of the plurality of components 150 changes, the SDK 160 and the application router 165 may assign functions to available components without constantly updating a predefined routing table each time the availability of a component changes. In this way, the present disclosure improves the functionality of the hybrid application 140 by providing a way to determine the routing of events on an as needed basis. Additionally, by dynamically determining the event routing, the present disclosure prevents unwanted technical difficulties, e.g., crashes of or glitches in the operation of the hybrid application 140, by preventing functions from being assigned to malfunctioning, disabled, or uninstalled components.

As noted above, in some embodiments, the application router 165 may serially transmit the request to execute the function to the non-requesting components. In some embodiments, the one or more rules may define that the function is assigned to the first component that positively responded to the inquiry regardless of a component type, e.g., the function is assigned to the component regardless if the component is a native component 152 or a web component 154. In some embodiments, the one or more rules may define that the function is assigned to the first component of a particular type that positively responded to the inquiry. For example, a native component 152 (or web component 154) may positively respond to the inquiry, however, the one or more rules may define that it is preferable for the particular function to be executed by a web component 154 (or a native component 152). As such, in this example, the SDK 160 may wait to assign the function to the first web component 154 (or native component 152) that positively responds to the inquiry.

As noted above, in some embodiments, the application router 165 may transmit the request to execute the function to the non-requesting components in parallel. In some embodiments, the one or more rules may define how to determine which component is assigned the function. For example, even when the inquiry is transmitted in parallel to the non-requesting components, the one or more rules may define that the function is assigned to the first component that positively responded to the inquiry regardless of a component type or the one or more rules may define that the function is assigned to the first component of a particular type that positively responded to the inquiry, as discussed herein.

Additionally, the one or more rules may define that components that are slow to respond to the inquiry are not assigned the function. For example, the one or more rules may define that if a response of the component exceeds a timeout period, the function is not assigned to the component even when the component positively responds to the inquiry.

The one or more rules may also define that a component that most recently executed the function may be skipped on a next instantiation of the function, such that the function is assigned to a different component on the next instantiation.

The one or more rules may define that the function should be assigned to the component based on a resource consumption of the components. For example, when the inquiry is serially transmitted to the non-requesting components, the SDK 160 may analyze the resource consumption of the component, and assign the function to the component when the resource consumption is below a threshold value. As another example, when the inquiry is transmitted in parallel to the non-requesting components, the SDK 160 may analyze the resource consumption of each component that positively responded to the inquiry and function may be assigned to the component consuming a least amount of processing resources. In some embodiments, the resource consumption may be based on a memory consumption, processing power consumption, energy consumption, or the like.

In some embodiments, the one or more rules may define which components should execute certain functions based on a user and/or user groups. For example, the SDK 160 may determine that for user A (or user group A), some functions should be assigned to a native component 152 (or web component 154), whereas for user B (or user group B), the same functions should be assigned to a web component 154 (or native component 152).

In some embodiments, the one or more rules may be based on a location of the device 110. For example, when the device 110 is outdoors, the one or more rules may define that the function should be assigned to a native component 152 (or web component 154), whereas when the device 100 is indoors, the one or more rules may define that the function should be assigned to a web component 154 (or native component 152).

In some embodiments, the one or more rules may be based on a type of network connection of the device 110. For example, when the device 110 is connected to the network 125 using a wired connection, the one or more rules may define that the function should be assigned to a native component 152 (or web component 154), whereas when the device 110 is connected to the network 125 using a wireless connection, the one or more rules may define that the function should be assigned to a web component 154 (or native component 152). As another example, when the device 110 is connected to a cellular network, the one or more rules may define that the function should be assigned to a native component 152 (or web component 154), whereas when the device 110 is connected to a PLMN, a LAN, a WAN, a MAN, etc., the one or more rules may define that the function should be assigned to a web component 154 (or native component 152).

In some embodiments, the one or more rules may be based on a device type of the device 110. For example, for devices having a larger display, such as a tablet or laptop, the one or more rules may define that the function should be assigned to a native component 152 (or web component 154), whereas for devices with a smaller display, such as a cellular device, the one or more rules may define that the function should be assigned to web component 154 (or a native component 152).

In some embodiments, the one or more rules may be based on a connection speed of the device 110. For example, for connection speeds below a threshold value, e.g., 300 megabits per second, the function should be assigned to a native component 152 (or web component 154), whereas for connection speeds above the threshold value, the function may be assigned to a web component 154 (or native component 152). It should be understood by those of ordinary skill in the art that this is merely an example threshold connection speed and that other threshold values are contemplated in accordance with aspects of the present disclosure.

It should be understood by those of ordinary skill the arts that the aforementioned rules are merely example rules that may be applied when determining which component is to be assigned a given function, and that other rules are further contemplated in accordance with aspects of the present disclosure.

In response to determining which component to assign the function to, the application router 165 may then assign the function to the determined component. For example, the application router 165 may assign the function to the determined component by requesting that the determined component perform the function related to the event. In some embodiments, the function may be a visual transition from a first graphical user interface (GUI) to a second GUI. In response to the function being executed, the hybrid application 140 may display the second GUI on the device 110.

Figure 3:
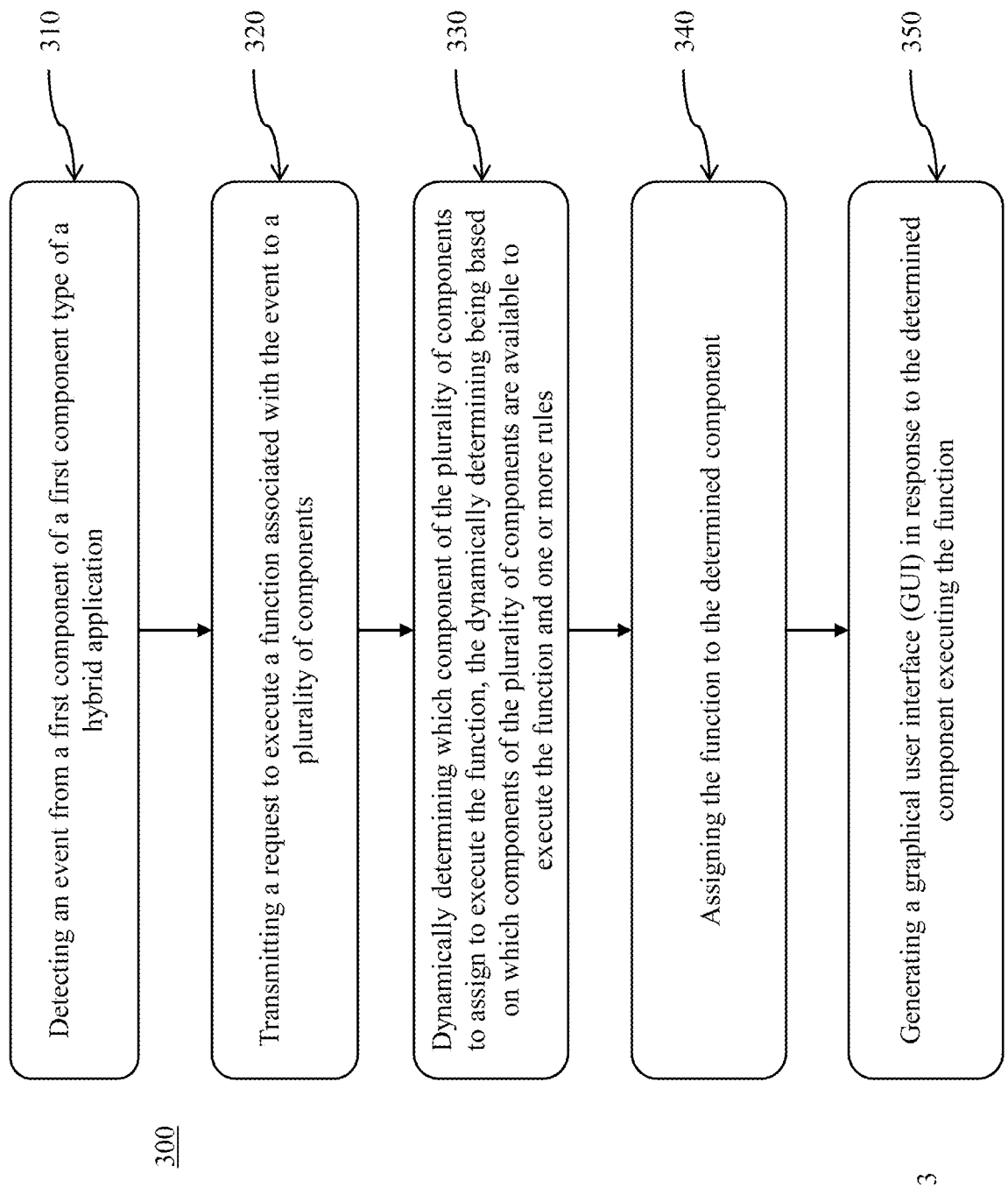
FIG. 3 is a flowchart illustrating a process for dynamically routing an event to a component of a hybrid application, according to some example embodiments.

FIG. 3 is a flow chart of an example method 300 for dynamically routing an event. In some embodiments, one or more processes described with respect to FIG. 3 may be performed by the device 110 of FIG. 1.

At 310, the method 300 may include detecting an event from a first component of a first component type of a hybrid application. For example, the first component type may be a native component 152 or a web component 154, and the event may be a request to navigate to a particular location/feature of the hybrid application 140. In some embodiments, the event may be generated in response to a user interacting with the hybrid application 140.

At 320, the method 300 may include transmitting a request to execute a function associated with the event to a plurality of components. In some embodiments, the plurality of components may be a combination of components of the first component type and components of a second component type different from the first component type. For example, the plurality of components may be a combination of native components 152 and web components 154. In some embodiments, the first component that requested the event may be different from the plurality of components, i.e., the first component may be a requesting component and the plurality of components may be non-requesting components. In some embodiments, transmitting the request to execute the function may include transmitting the request serially to the plurality of components. In some embodiments, transmitting the request to execute the function may include transmitting the request in parallel to the plurality of components. In some embodiments, transmitting the request to execute the function may include transmitting the request for each instantiation of the function.

At 330, the method 300 may include dynamically determining which component of the plurality of components to assign to execute the function. The dynamically determining may be based on which components of the plurality of components are available to execute the function.

At 340, the method 300 may include assigning the function to the determined component. For example, the application router 165 may assign the function to the determined component, which in turn, may execute the function and provide the result back to the application router 165.

At 350, the method 300 may include generating a graphical user interface (GUI) in response to the determined component executing the function. For example, in response to the function being executed, the hybrid application 140 transition from a first GUI displayed on the device 110 to a second GUI displayed on the device 110.

Figure 4:
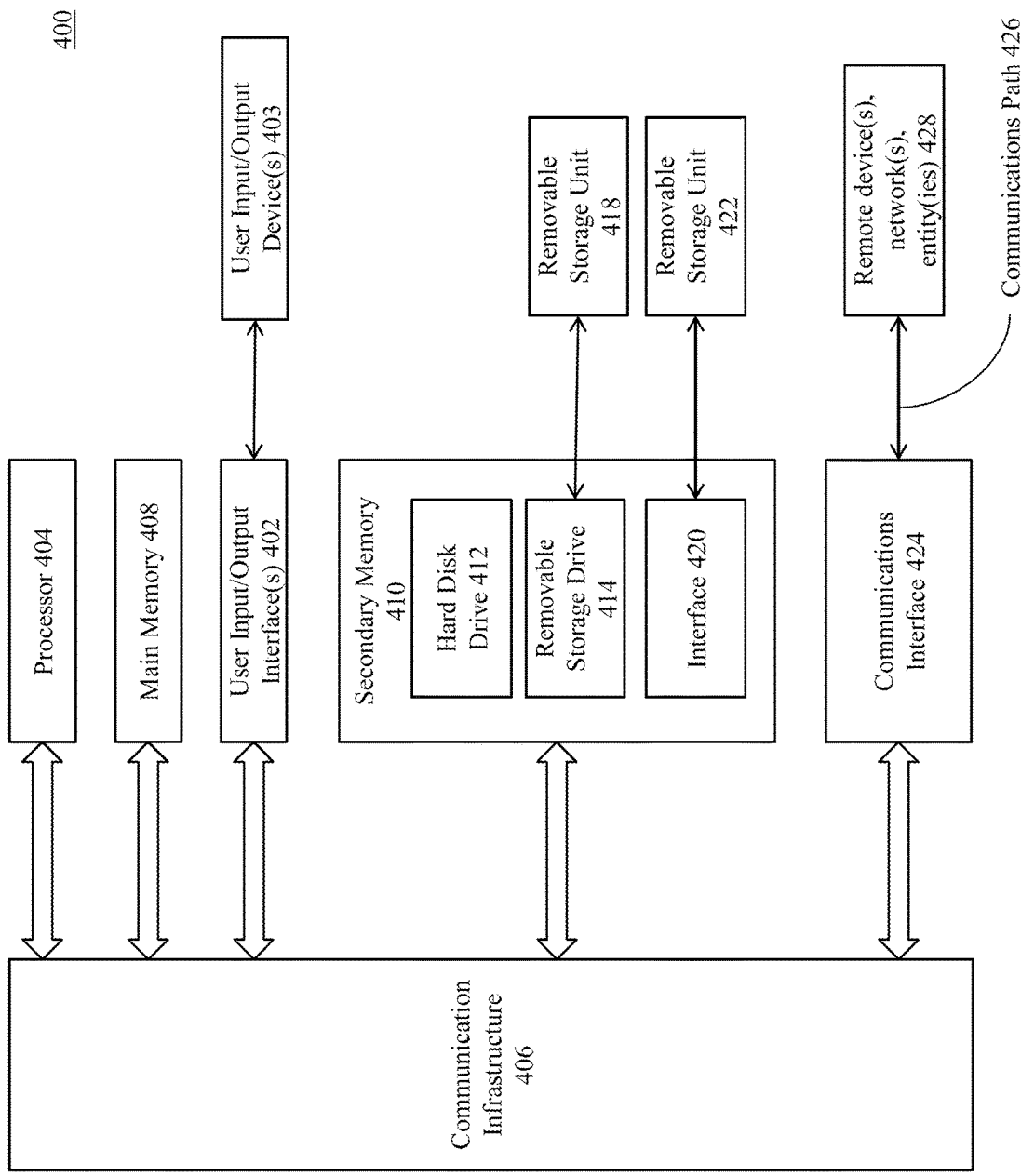
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method, comprising:
   detecting an event from a first component of a plurality of components of a hybrid application, wherein the first component of the plurality of components of the hybrid application corresponds to a first component type and the plurality of components of the hybrid application comprises components corresponding to a second component type different from the first component type;
   determining, using an agnostic routing grammar, one or more components in the plurality of components of the hybrid application available to execute a function associated with the event at the detection of the event;
   selecting, according to a rule, a second component in the available one or more components in the plurality of components of the hybrid application based on a response of the available one or more components in the plurality of components of the hybrid application to an inquiry for executing the function;
   assigning the function to the second component in the available one or more components in the plurality of components of the hybrid application for execution; and
   generating a graphical user interface (GUI) in response to the second component in the available one or more components in the plurality of components of the hybrid application executing the function.

2. The computer-implemented method of claim 1, further comprising transmitting the inquiry for executing the function serially to the available one or more components in the plurality of components of the hybrid application.

3. The computer-implemented method of claim 2, wherein the rule defines that a first component in the available one or more components in the plurality of components of the hybrid application to positively respond to the inquiry for executing the function is selected.

4. The computer-implemented method of claim 1, further comprising transmitting the inquiry for executing the function in parallel to the available one or more components in the plurality of components of the hybrid application.

5. The computer-implemented method of claim 4, wherein, in response to receiving positive responses from two or more components from among the available one or more components in the plurality of components of the hybrid application, the selecting comprises selecting the second component from the two or more components from among the available one or more components in the plurality of components of the hybrid application based on the rule.

6. The computer-implemented method of claim 1, further comprising transmitting the inquiry for executing the function to the available one or more components in the plurality of components of the hybrid application for each instantiation of the function.

7. The computer-implemented method of claim 1, further comprising maintaining a list of available components for executing the function, and updating the list of available components, wherein the first component type is a native component type or a web component type and the second component type is the web component type or the native component type.

8. A device, comprising:
   a memory; and
   a processor coupled to the memory and configured to:
      detect an event from a first component of a plurality of components of a hybrid application, wherein the first component of the plurality of components of the hybrid application corresponds to a first component type and the plurality of components of the hybrid application comprises components corresponding to a second component type different from the first component type;
      determine, using an agnostic routing grammar, one or more components in the plurality of components of the hybrid application available to execute a function associated with the event at the detection of the event;
      select, according to a rule, a second component in the available one or more components in the plurality of components of the hybrid application based on a response of the available one or more components in the plurality of components of the hybrid application to an inquiry for executing the function;
      assign the function to the second component in the available one or more components in the plurality of components of the hybrid application for execution; and
      generate a graphical user interface (GUI) in response to the second component in the available one or more components in the plurality of components of the hybrid application executing the function.

9. The device of claim 8, wherein the processor is further configured to transmit the inquiry for executing the function serially to the available one or more components in the plurality of components of the hybrid application.

10. The device of claim 9, wherein the rule defines that a first component in the available one or more components in the plurality of components of the hybrid application to respond indicating that it will execute the function is selected.

11. The device of claim 8, wherein the processor is further configured to transmit the inquiry for executing the function in parallel to the available one or more components in the plurality of components of the hybrid application.

12. The device of claim 11, wherein, in response to receiving positive responses from two or more components from among the available one or more components in the plurality of components of the hybrid application, the processor is further configured to select the second component from the two or more components from among the available one or more components in the plurality of components of the hybrid application based on the rule.

13. The device of claim 8, wherein the processor is further configured to transmit the inquiry for executing the function to the available one or more components in the plurality of components of the hybrid application for each instantiation of the function.

14. The device of claim 13, wherein the processor is further configured to store, in the memory, a list of available components for executing the function, and updating the list of available components, and wherein the first component type is a native component type or a web component type and the second component type is the web component type or the native component type.

15. A non-transitory computer-readable storage device having instructions stored thereon that, when executed by at least one computing device, cause the at least one computing device to perform operations comprising:

detecting an event from a first component of a plurality of components of a hybrid application, wherein the first component of the plurality of components of the hybrid application corresponds to a first component type and the plurality of components of the hybrid application comprises components corresponding to a second component type different from the first component type;

determining, using an agnostic routing grammar, one or more components in the plurality of components of the hybrid application available to execute a function associated with the event at the detection of the event;

selecting, according to a rule, a second component in the available one or more components in the plurality of components of the hybrid application based on a response of the available one or more components in the plurality of components of the hybrid application to an inquiry for executing the function;

assigning the function to the second component in the available one or more components in the plurality of components of the hybrid application for execution; and generating a graphical user interface (GUI) in response to the second component in the available one or more components in the plurality of components of the hybrid application executing the function.

16. The non-transitory computer-readable storage device of claim 15, the operations further comprising transmitting the inquiry for executing the function serially to the available one or more components in the plurality of components of the hybrid application, wherein the rule defines that a first component in the available one or more components in the plurality of components of the hybrid application to positively respond to the inquiry for executing the function is selected.

17. The non-transitory computer-readable storage device of claim 15, the operations further comprising transmitting the inquiry for executing the function in parallel to the available one or more components in the plurality of components of the hybrid application.

18. The non-transitory computer-readable storage device of claim 17, wherein, in response to receiving positive responses from two or more components from among the available one or more components in the plurality of components of the hybrid application, the selecting comprises selecting the second component from the two or more components from among the available one or more components in the plurality of components of the hybrid application based on the rule.

19. The non-transitory computer-readable storage device of claim 15, the operations further comprising transmitting the inquiry for executing the function to the available one or more components in the plurality of components of the hybrid application for each instantiation of the function.

20. The non-transitory computer-readable storage device of claim 19, the operations further comprising maintaining a list of available components for executing the function, and updating the list of available components, wherein the first component type is a native component type or a web component type and the second component type is the web component type or the native component type.

* * * * *